Oct. 12, 1971 V. T. LIGHT 3,611,591
GOLF TRAINING DEVICE
Filed Feb. 24, 1969 3 Sheets-Sheet 1
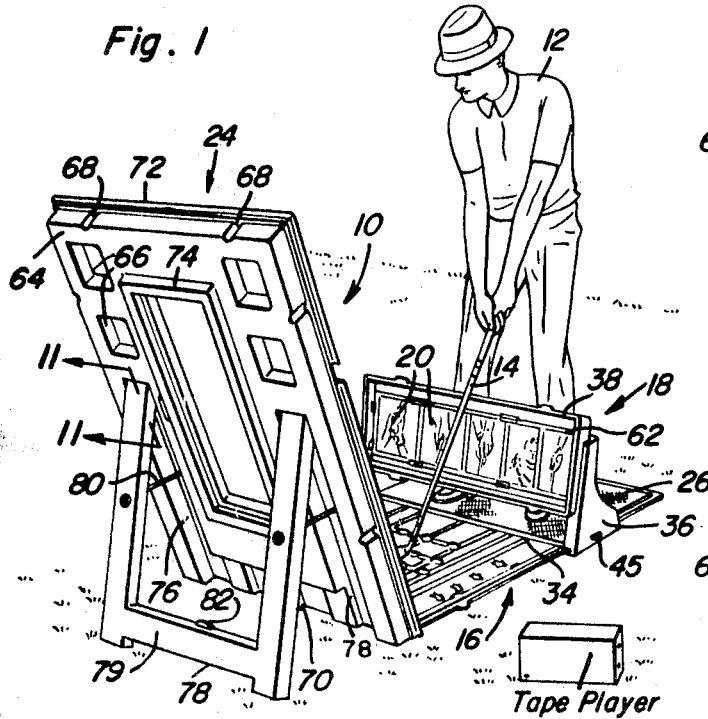
Fig. 1
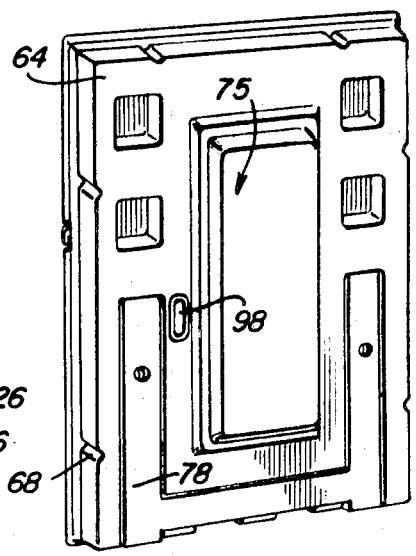
Fig. 3
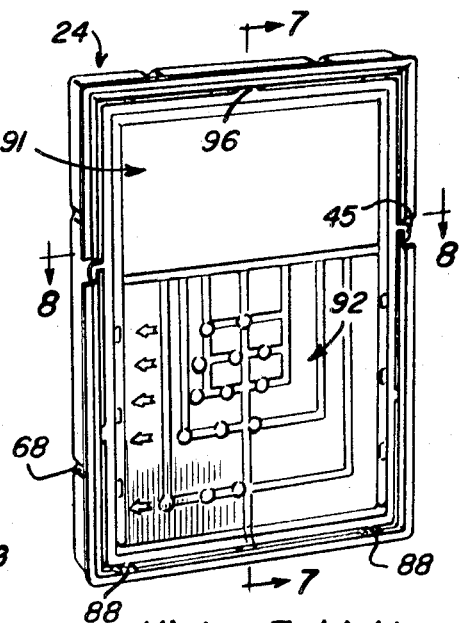
Fig. 2
Fig. 4
Victor T. Light
INVENTOR.
BY *Clarence A. O'Brien*
and *Harvey B. Jacobson*
Attorneys

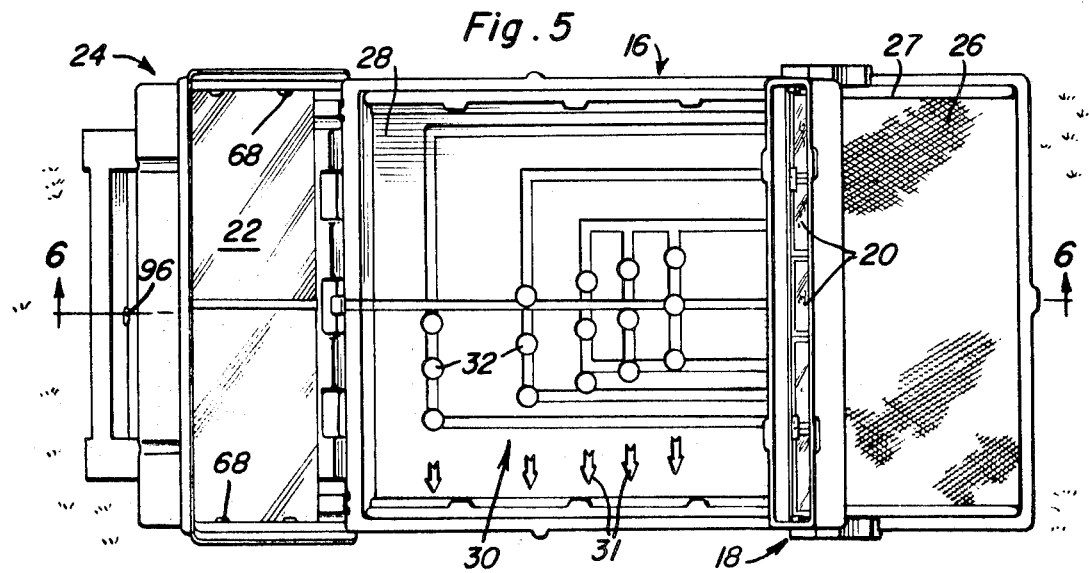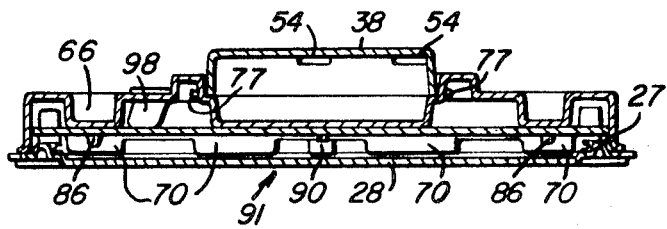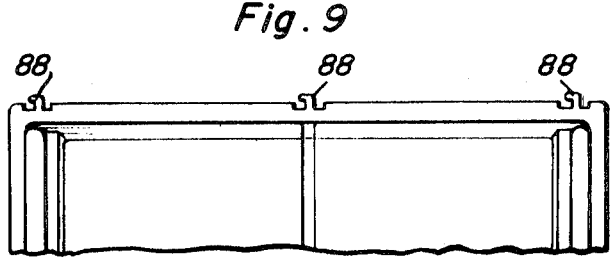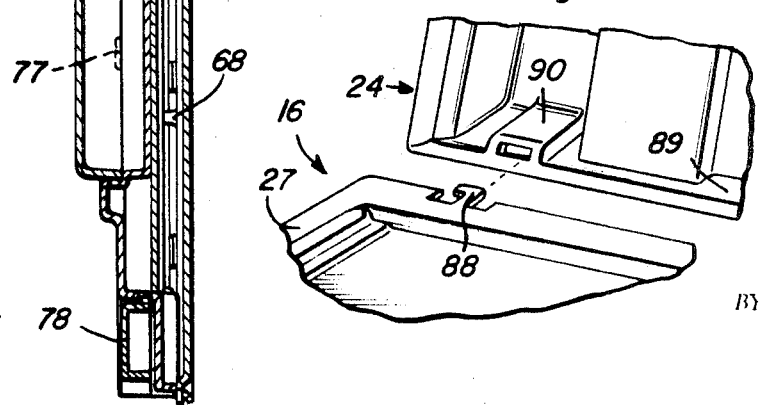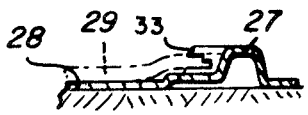

Oct. 12, 1971  V. T. LIGHT  3,611,591
GOLF TRAINING DEVICE
Filed Feb. 24, 1969  3 Sheets-Sheet 3
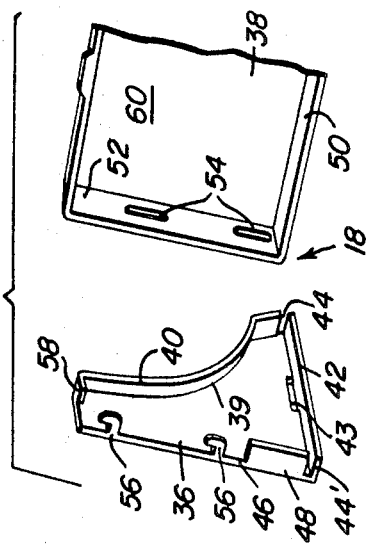
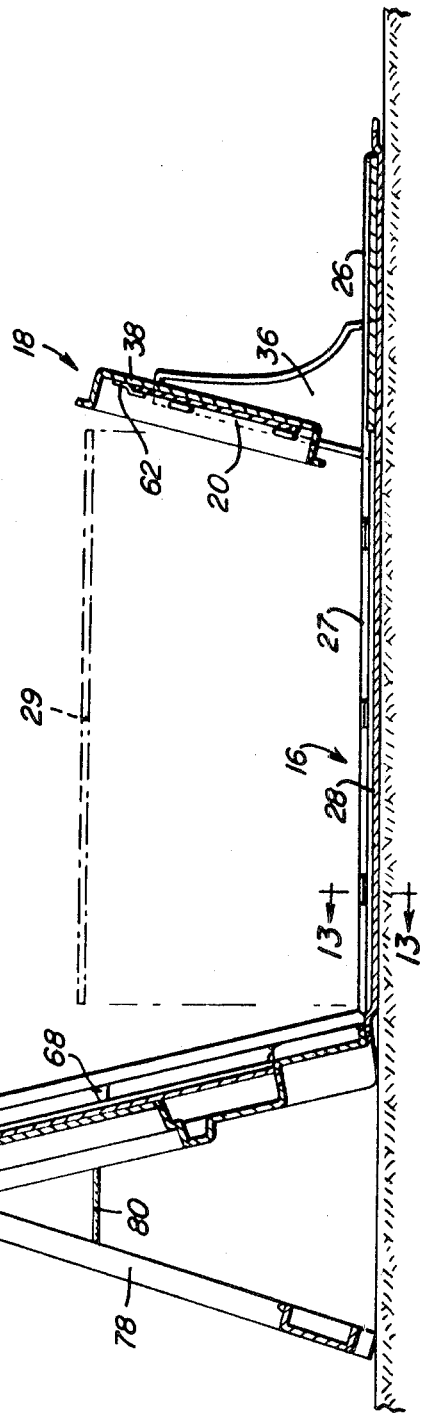
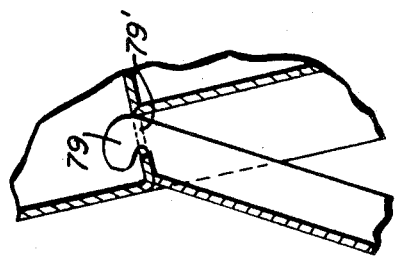
Victor T. Light
INVENTOR.
BY *Clarence A. O'Brien*
and *Harvey B. Jacobson*
Attorneys United States Patent Office 3,611,591
Patented Oct. 12, 1971

3,611,591
GOLF TRAINING DEVICE
Victor T. Light, Sarasota, Fla., assignor to Professional Images Corporation
Filed Feb. 24, 1969, Ser. No. 801,735
Int. Cl. G09b 15/06
U.S. Cl. 35—29 R    8 Claims

ABSTRACT OF THE DISCLOSURE

A frame-like housing encloses a mirror which is normally inclined upwardly. A display holder is positioned to reflect a photograph on the reflecting surface of the mirror. A mat connects the lower edge of the housing and includes indicia thereon for aiding a golfer in positioning himself and a club so that his image is similar to that reflected by the photograph.

---

The present invention relates to teaching devices and more particularly to a self-instructing device for perfecting one's ability to effectively use a golf club.

The prior art includes a number of mirror-type devices which include markings thereon for guiding a learner's use of a golf club. However, such devices generally lack a suitable frame of reference which permits the learner to compare his positions with standard poses. Certain other devices include a mirror and a stand for retaining a number of pictures thereon. In such devices, the pictures are positioned adjacent the mirror so that an individual may inspect his reflected image and compare it with a similar pose shown in the picture. However, these devices fall short of instructing a student properly and efficiently because the device does not include guidelines or other indicia on a ground surface to guide the path of golf club travel during a swing.

The present invention includes a self-instructing device which is portable and collapsible to form a compact package. The present invention includes a display holder which mounts several photographs or figures showing emulatable golf poses. These figures are reflected onto an oppositely and confrontingly disposed mirror. A mat having indicia thereon is positioned to lie between the lower edge of the mirror and the display holder. In operation of the device, a participant stands upon the mat and positions his club in accordance with the guidelines demarked by indicia on the mat. While keeping his head in a downward direction, the participant may view his pose or stance and compare it with the figure to be emulated. The guidelines of the indicia direct the travel of golf club swing. As will be appreciated, the invention permits simultaneous reflection of the learner's image as well as the reflected figures and indicia marks. The indicia marks are further employed to assist the learner in positioning himself properly upon the mat. The composite reflection on the mirror permits the participant to quickly compare his pose with that of the reflected photograph. Thus, the present invention offers a means of rapidly and efficiently teaching proper body poses and motion. Further, the present device is designed to permit disassembly of the display holder and attachment thereof to a housing which mounts the mirror. The mount is hingedly mounted to the housing so that during periods when the device is not used, the mat may be positioned within the housing thereby forming a flat, compact package.

The present invention can also be employed in teaching industrial skills by including pictures illustrating various poses assumed during a manual industrial operation. Also, the present invention can be utilized to teach correct body motion in other sports such as tennis, hand ball and the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the present instructing device with a golfer.

FIG. 2 is a perspective view of the present invention in a direction for reflecting the image of a golfer.

FIG. 3 is a perspective view illustrating the instant device when closed to form a compact package.

FIG. 4 is a view similar to FIG. 3 taken from an opposite side.

FIG. 5 is a top plan view of the assembled invention shown in FIG. 1.

FIG. 6 is a longitudinal sectional view taken along a plane passing substantially through section line 6—6 of FIG. 5.

FIG. 7 is a longitudinal sectional view taken along a plane passing substantially along section line 7—7 of FIG. 4.

FIG. 8 is a transverse sectional view taken along a plane passing through section line 8—8 of FIG. 4.

FIG. 9 is a partial top plan view illustrating hinge latch members.

FIG. 10 is an enlarged view illustrating the latch member shown in FIG. 9 along with a mating keeper.

FIG. 11 is a partial sectional view illustrating the pivotal connection between the mirror housing and the support associated therewith taken along a plane passing through section line 11—11 of FIG. 1.

FIG. 12 is a perspective view illustrating a partial exploded view of a display holder.

FIG. 13 is a sectional view along section line 13—13 of FIG. 6 illustrating the tabs which retain the hitting mat in place.

Referring to the figures and more particularly FIG. 1 thereof, the present self-instructing device is generally denoted by reference numeral 10 which in terms of the present specification is described as an aid to teaching or perfecting the ability of a golfer, indicated by 12, who is holding a golf club 14 in a typical golf pose. In the figure, there will be seen three basic components of the invention. The first component is a mat 16 which mounts a second component, a display holder indicated by 18. The latter is positioned transversely above the mat. The holder mounts a plurality of photographs or figures 20 illustrating golf poses to be emulated by the golfer. The images of the figures 20 are reflected by a mirror generally denoted by 22 and seen in FIG. 2. The mirror is retained within a frame-like housing 24 which forms the third basic component of the present invention. As seen in FIG. 1, the golfer 12 may view his reflected image as well as the reflected photographs while maintaining his head downwardly thereby keeping his eye on the club head.

Referring to FIG. 5, mat 16 is seen to include an outward transverse end portion 26 characterized as a grass-like rug 26, fabricated from a suitable material such as plastic, nylon or the like to provide the "feel" of a golf course. The central portion of the elongated mat is indicated by 28 and is seen to include a series of generally concentric U-shaped grid paths 30 embossed in mat 16 or indicated thereon by means of painted strips or the like. The open end of the U-shaped grid paths extend to the inward edge of rug 26 as denoted by reference numeral 34 in FIG. 1. Each U-shaped pattern can be differently colored so that the open ends of each pattern demark a unique position next to which the golfer is to place his feet. The bight section of each U-shaped path lies transversely of mat 16 and represents a guideline for the motion of a golf club head with arrows 31 aligned therewith to direct a student golfer to follow through in his golf swing. Each bight section also includes a number of circular areas 32 representing golf ball positions. The circular areas may be embossed in the mat or suitably indicated thereon by such means as paint or the like and the rug 26 may be retained on mat 16 by a raised rib or edge 27 along the side edges and across the end thereof. A hitting pad or mat 29 is positioned on the top surface of the mat 16 in overlying relation to the paths 30 for supporting a golf ball during certain periods of use. The mat 29 is releasably retained in place by a plurality of inwardly extending tabs or lugs 33 formed integrally with the raised ridge 27 which receive the side edges of the mat 29 thereunder.

As shown in FIGS. 6 and 12, the display holder indicated by 18 includes two generally triangular members 36 serving as vertical supports for an elongated frame 38. The frame itself mounts the photographs or diagrams which illustrate proper golf poses. Referring to the upright support member 36, the hypotenuse edge 39 of the member is seen to be curvilinear and includes an arcuate ledge 40. The base of the member includes a straight ledge portion 42 which is separated from adjoining leg portions by means of a central slot 43, a slit 44 formed in the lower end of ledge 40 and a similar slit 44' formed in the lower edge of ledge 48, the latter being a part of the side opposite the hypotenuse. The purpose of the oppositely disposed slits 44 and 44' is to permit the insertion of the upright member 36 onto the lateral edges of mat 16 while slot 43 receives a hook tab 45 on the mat edge. The upper edge of ledge portion 48 appends to a more narrow ledge portion 46 defining the remainder of the triangular side opposite the hypotenuse. This narrowed ledge mounts two spaced and generally L-shaped tabs or latch members 56 which extend in the same direction as ledge portion 48. The latch members 56 are spaced from one another and are adapted for insertion within slots 54 formed in the lateral transverse portions 52 of peripheral flange 50. The upper edge of the upright member 36 is parallel with respect to the base 42 and as such represents a generally truncated triangular member. The upper edge includes a generally L-shaped ledge 58 that permits the insertion of frame member 38 therein to aid in rigidifying the display holder assembly 18. As will be appreciated from viewing FIG. 12, by sliding the upright member with respect to the frame member 38, the mating members may be disengaged from one another and by sliding the upright member 36 away from mat 16, the display holder assembly 18 may be removed and disassembled. As will be noted by viewing FIG. 12, the frame member 38 includes a base 60 to which is attached a rail assembly 62 seen in FIG. 1. The rail assembly is divided to permit the removable mounting of photographs or diagram sheets therein.

The particular structure of the frame-like housing 24 includes a back panel 64 having two laterally spaced rows of square-shaped corrugations 66 formed therein. It will be noted that the housing may be fabricated from cast metal, molded plastic or the like. In addition to the rigidifying and strengthening effect of the corrugations, indentations 68 are formed along the peripheral edge of the housing to add structural strength as well as providing inwardly extending projections for retaining the mirror 22 in position as seen in FIG. 2. These projections also serve as a mechanical stop when folding the mat 16 into engagement with housing 24 as seen in FIG. 7. The normally lower edge of the housing 24 includes a number of spaced, generally rectangular rib elements 70 serving to structurally reinforce the housing. Further, the upper edges of the rib elements provide a supporting surface for a contacting lower edge of mirror 22.

The housing 24 is further characterized by a rectangular ledge 72 formed along the opening edge of the housing. The ledge is outwardly offset to receive the peripheral edges of mat 16 whein the latter is positioned to be enclosed within housing 24, in the folded position, as seen in FIGS. 3 and 4. As FIG. 1 further illustrates, the rear surface of base panel 64 includes an integrally formed outwardly projecting rectangular frame element 74 which serves to peripherally enclose the component parts of the display holder 18 shown in FIG. 3 and denoted by 75. FIGS. 7 and 8 illustrate the inclusion of detent projections 77 around the periphery of frame 38 which engage mating slots in frame element 38 to allow retention of the frame 38 within frame element 74. An additional characteristic of the base panel 64 is the inclusion of two parallel spaced recesses 76 extending from transversely aligned intermediate points adjacent the lateral sides of housing 24 to the lower edge of the housing. These recesses are adapted to engage vertical leg portions of a generally U-shaped support assembly 78. The lower transverse edge of housing 24 is recessed to receive a cross brace member 79 of the support assembly 78. Flexible bands 80 are connected between the interior of a respective recess 76 and a respective vertical leg portion of support assembly 78 to retain the same in an adjustable outward position which causes the housing 24 to maintain selectable upwardly and outwardly inclined position. A detent projection 82 is attached to an upper surface of cross brace 79 and is adapted to engage a mating slot within a transversely disposed recess 77, communicating at opposite ends with recesses 76, thereby permitting the retention of support assembly 78 in closed flush relation with base panel 64, as seen in FIG. 3.

Noting FIG. 6, there will be seen an adjustable sliding rod 84 which is slidably mounted between the transverse edges of mirror 22. The purpose of the bar is to permit the vertical alignment of certain body portions with the rod as required in instructing a golfer. Tabular portions 86 extend from the upper edge of rib members 70 and serve a function similar to projections 68, that is to retain mirror 22 in overlying juxtaposition with the base panel 64 of housing 24.

Referring to FIG. 9, the transverse mat edge, normally retained adjacent the lower edge of housing 24, includes outwardly projecting generally L-shaped tabular elements 88. In FIG. 10, there is shown a channel receiver 90 formed along the lower housing edge 89. Each tabular element 88 and associated receiver 90 are separable to permit individual fabrication of mat 16 and housing 24. However, the two parts may be easily assembled by merely sliding the tabular members 88 into the receivers 90 and displacing the mat 16 transversely, to obtain a locking engagement. However, when so desired, the mat 16 may be pivotally rotated into engagement with housing 24 due to the flexible nature of tabular element 88. This non-use position is shown in FIG. 4 wherein the underside of mat 16 is indicated by 91. The reversed embossed indicia is denoted by 92. Thus, in effect, the tabular elements 88 and the receivers 90 associated therewith form hinges. In order to retain mat 16 in engaging relation with housing 24, a detent projection 96 is formed along the outer transverse edge, and is adapted to engage a mating slot along a mating portion of housing 24.

In operation of the device, a golfer 12 stands on the rug portion 26 of mat 16. Suitable photographs or diagrams are placed within the display holder so that the images are reflected from the reflecting surface of the mirror. By normally positioning his hands around a golf club, the golfer may compare and adjust his grip which is simultaneously reflected from the mirror along with the images from the photographs. The golfer can then readily determine when his grip is substantially similar to the reflected photograph image. By positioning the club head along the transverse indicia formed on mat 16, the golfer may practice the direction of club head swing as well as correct foot placement in accordance with longitudinally oriented indicia strips. As will be appreciated, the display holder may be adapted to hold photographs or diagrams illustrating posed swings as well as grips.

The golfer may compare his swing positions with those from the reflected photographs and by so doing, he may alter his body position to conform with those in the photographs. The particular indicia lines are color coded so that a golfer may be instructed to place his feet in alignment with differently colored lines, depending upon the type of stance or swing. Instruction toward these ends may be furnished by an instructor or from a pre-recorded message which is played back on a tape player denoted by 100 placed in close proximity to the training device. This tape player is preferably of the conventional cartridge type which requires no winding or unwinding of the tape. As will be obvious, the tape player may be driven by batteries or from a convenient electrical outlet.

Although the present invention is described in terms of a golf training apparatus it will be noted that photographs illustrating body positions for other sports may be mounted in the display holder thereby permitting a participant to perfect poses and swings in such amenable sports as tennis, hand ball and the like. Further, it is contemplated that the present invention may be utilized to teach manual manipulation for teaching certain industrial or machining operations. In this regard, the photographs would include poses or hand positions indicative of a manual industrial process.

It is of particular significance to note that the present invention enables a simultaneous viewing of one's self as well as the reflected photographs and guiding indicia located on the mat. This enables a participant to compare his posture or poses with preselected ideal poses without lifing his head which would cause inconvenience and disruption during learning process.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-instructing device comprising a housing, a mirror secured within the housing, support means connected to the housing for normally retaining the mirror in an upwardly inclined position, a mat having a transverse edge adjacent the lower edge of the housing, the mat having a transverse end portion for supporting a participant thereon, a display holder connected to the mat in the vicinity of the transverse end portion, an intermediate section of the holder being disposed transversely of the mat in an elevated position thereover, the holder being adapted to display a plurality of figures representing poses to be emulated, the figures being reflected in the mirror, and indicia formed on the central surface portion of the mat for aiding a participant in positioning himself so that his reflected image can be compared with the reflected figures.

2. The device set forth in claim 1 wherein the inclination of the mirror housing is adjustable to permit the simultaneous reflection of the figures, the indicia, and the participant.

3. The device set forth in claim 2 wherein a recess is formed in the housing to permit the positioning of the support means in flush relation with the housing when the device is not being used, and further wherein the support means are pivotally connected at their upper ends to the recess to permit pivotal outward displacement of the support means when the device is in a utilized position.

4. The device set forth in claim 3 wherein the display holder includes separable joint members for permitting the disassembly and removal of the display holder.

5. The device set forth in claim 4 wherein the housing includes an additional recess for mounting a diassembled display holder thereby serving to form a more compact package during non-use.

6. The device set forth in claim 5 wherein the housing and an adjacently positioned edge of the mat are hingedly connected to allow folding of the mat into the housing when the device is not in use.

7. The device set forth in claim 6 wherein the housing includes corrugations therein for increasing the rigidity and structural strength thereof.

8. The device set forth in claim 1 together with a tape player located in close proximity to the device, the tape player offering pre-programmed instructions to a participant.

References Cited

UNITED STATES PATENTS

| 1,558,762 | 10/1925 | Richter | 35—29 X |
| 3,110,495 | 11/1963 | Carter | 273—35 |

FOREIGN PATENTS

| 578,441 | 6/1933 | Germany | 35—58 |

HARLAND S. SKOGQUIST, Primary Examiner

U.S. Cl. X.R.

35—58